Sept. 5, 1939.                H. Y. MAGEOCH                2,171,857
                        AUTOMATIC STATION INDICATOR
                  Filed July 7, 1938          4 Sheets-Sheet 1
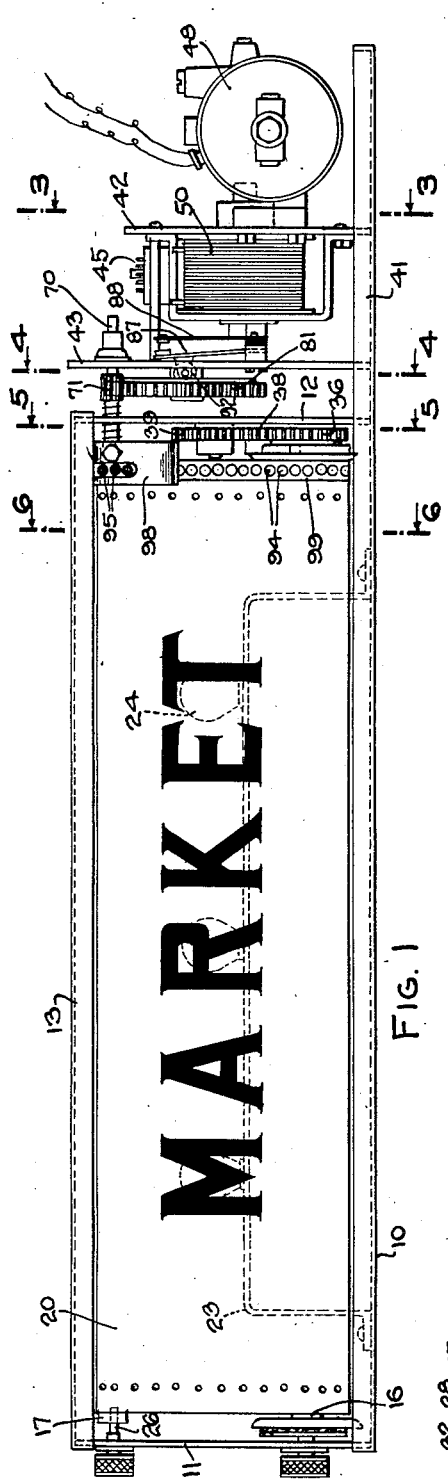
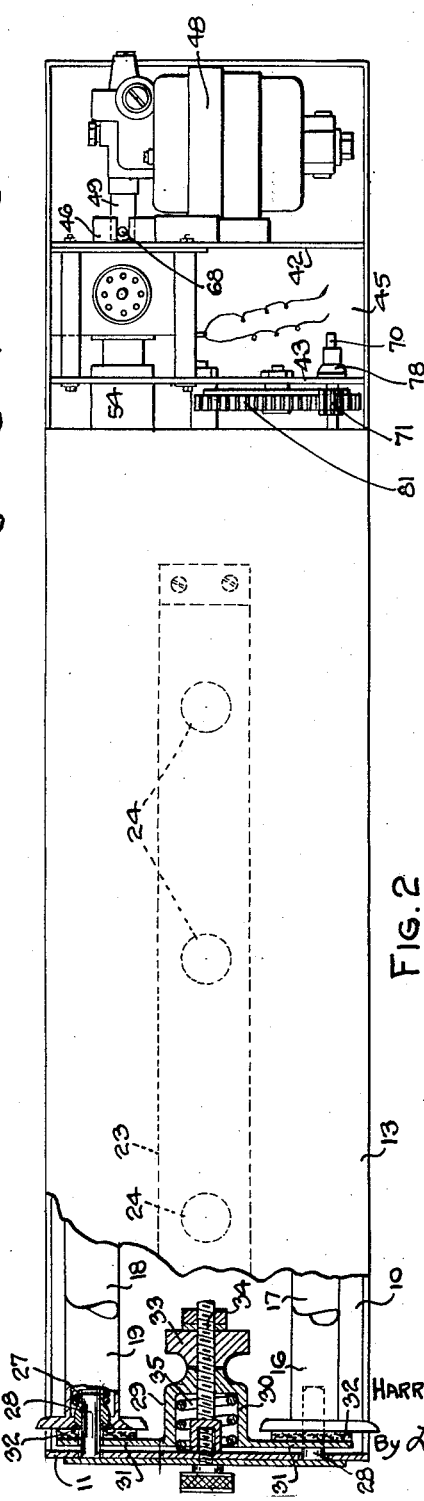
Inventor:
HARRY YALE MAGEOCH
By Lew Edelson
Attorney Sept. 5, 1939.  H. Y. MAGEOCH  2,171,857

AUTOMATIC STATION INDICATOR

Filed July 7, 1938  4 Sheets-Sheet 2

Inventor:
HARRY YALE MAGEOCH
By Leon Edelson
Attorney.

Sept. 5, 1939.  H. Y. MAGEOCH  2,171,857
AUTOMATIC STATION INDICATOR
Filed July 7, 1938  4 Sheets-Sheet 3
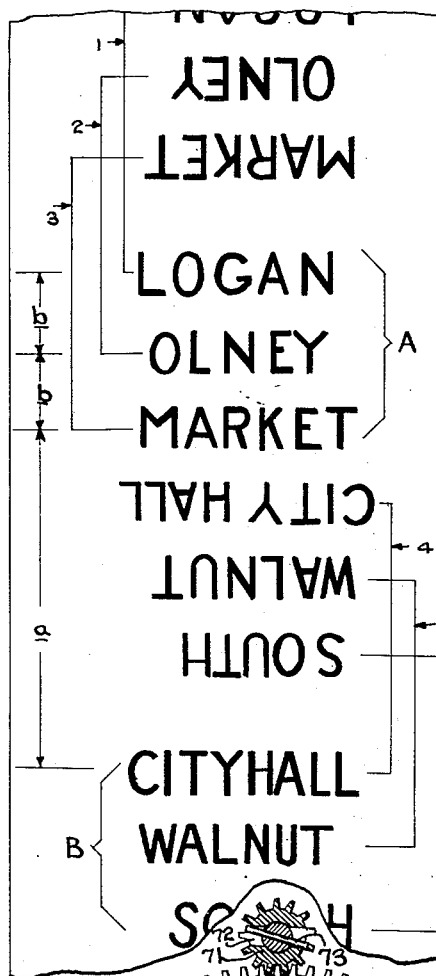
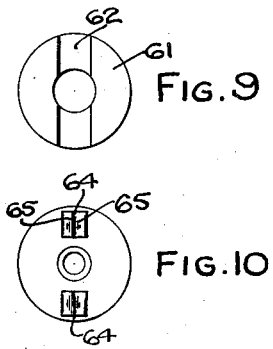
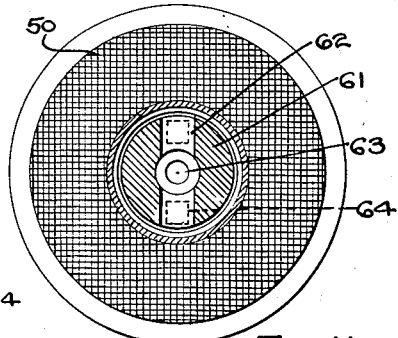
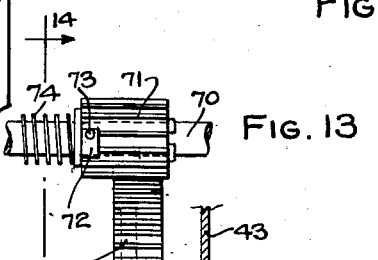
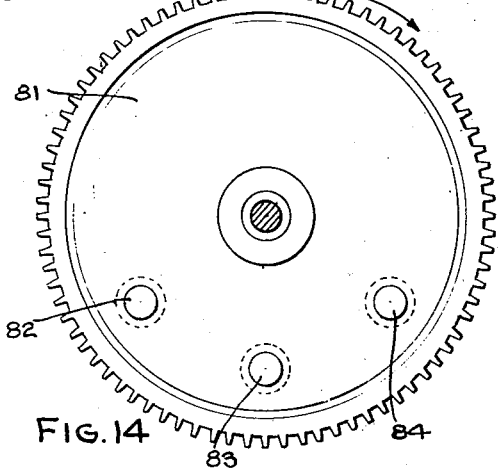
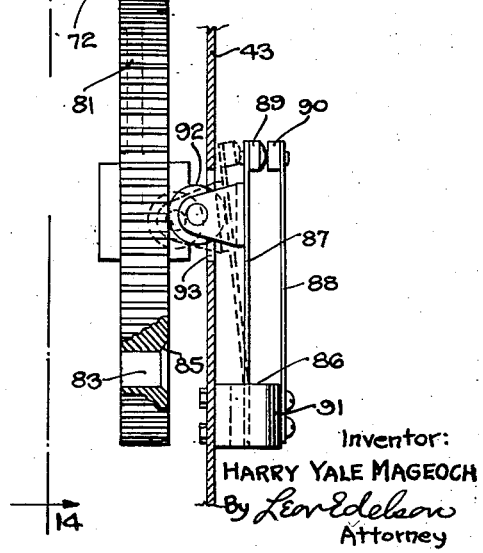
Inventor:
HARRY YALE MAGEOCH
By Leon Edelson
Attorney Sept. 5, 1939.     H. Y. MAGEOCH     2,171,857
AUTOMATIC STATION INDICATOR
Filed July 7, 1938     4 Sheets-Sheet 4

Inventor:
HARRY YALE MAGEOCH
By Leon Edelson
Attorney.

Patented Sept. 5, 1939

2,171,857

UNITED STATES PATENT OFFICE 2,171,857

AUTOMATIC STATION INDICATOR

Harry Yale Mageoch, Philadelphia, Pa., assignor to Electric Service Supplies Company, Philadelphia, Pa., a corporation of Pennsylvania Application July 7, 1938, Serial No. 217,868

17 Claims. (Cl. 40—53)

This invention relates to an improved construction of station indicator adapted for use in subway trains, street cars and other vehicles traversing a fixed route and operative to automatically indicate the name of the stop station which the vehicle is approaching.

While the use of station indicators in traveling vehicles has been proposed from time to time in the past, they have not been generally adopted due to various difficulties which interfered with their successful automatic operation. In practically all of these station indicators, the names of the stations appear upon a web which is wound upon suitable rolls therefor to display successively and in predetermined order the names of the various stations along the route followed by the vehicle. In order to provide a compact unit, the web is necessarily formed of a fabric which can be more or less tightly wound about the rolls with which it is associated. However, inasmuch as this flexible fabric is subject to stretch during use thereof, considerable difficulty has been encountered in designing a station indicator unit which insures the accurate centering of a given name in the unit each time that name is displayed. It is among the objects of the present invention to overcome this particular difficulty by the provision of means which insures against inaccurate placement of the station names in the observation window of the station indicator unit while employing a web formed of a fabric sufficiently flexible to enable it to be wound more or less tightly about its associated operating rolls.

A further difficulty encountered in connection with the operation of automatic station indicators has been the inability to insure against continuing movement of the web following the instant when such movement should definitely cease in order to insure that the name of a given station appears properly centered within the observation window of the unit. This difficulty is inherent in those mechanisms wherein an electric motor or other drive is employed to progressively shift the web about its rolls to successively present to view the names of the several stations, this being due to the fact that when the driving power delivered by the motor or other drive is interrupted, the inertia of the moving parts is sufficient to shift the web beyond its intended point of arrested motion. Accordingly, it is a further object of the present invention to provide in an automatically operated station indicator means for arresting the motion of the web instantaneously at a predetermined point to thereby insure the proper centering of the station name as it appears on the web within the observation window of the unit.

A further and important object of the present invention is to provide means for insuring a constant fixed relationship between the web and its associated rolls to the end that even though the web may be subjected to stresses and strains which may tend to stretch or elongate it, the names appearing on the web nevertheless properly register at all times in the observation window or windows of the unit. Stated in another manner, it is an object of the present invention to provide indexing means which operate to insure the location of each station name in a predeterminedly fixed position simultaneously as the motion of the web is arrested to designate the name of the station being approached as a stop.

Other objects and advantages of the present invention will appear more fully hereinafter, it being understood that the invention consists substantially in the combination, construction, location and relative arrangement of parts, all as will be described hereinafter, as shown in the accompanying drawings and as finally pointed out in the appended claims.

In the accompanying drawings, in which is illustrated a preferred construction embodying the principles of the present invention—

Figure 1 is a front elevational view of the station indicator constructed in accordance with and embodying the principles of the present invention;

Figure 2 is a top plan view of the apparatus as shown in Figure 1, a portion of this view being broken away and sectioned to better illustrate the details of construction;

Figure 3:
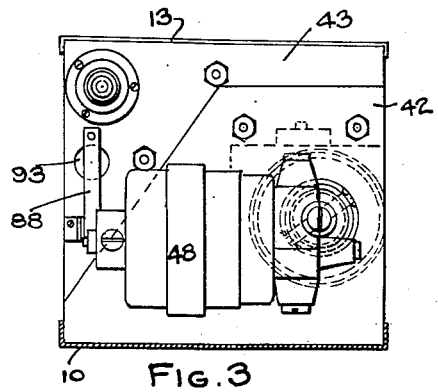
Figure 4:
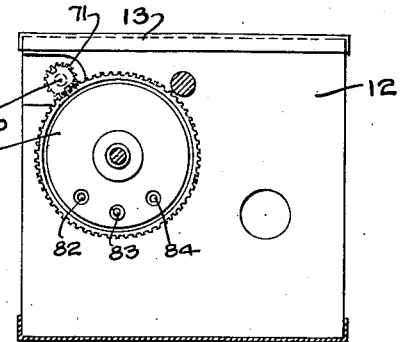
Figure 5:
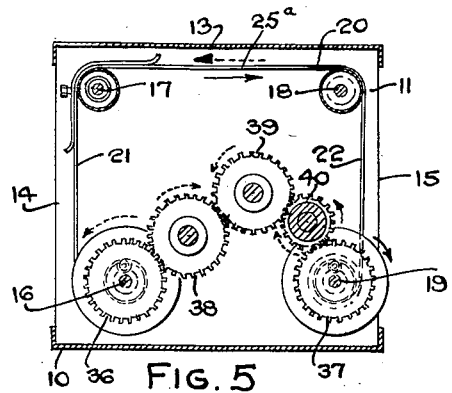
Figure 6:
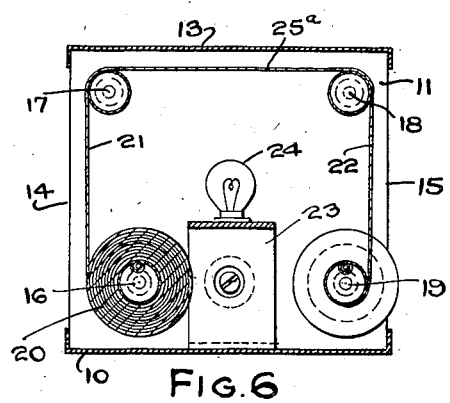
Figures 7, 8:
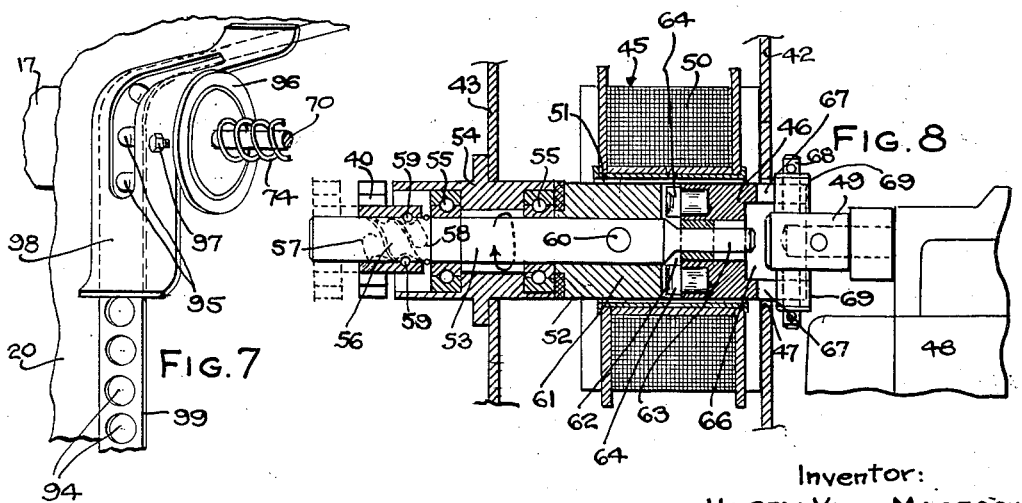
Figure 15:
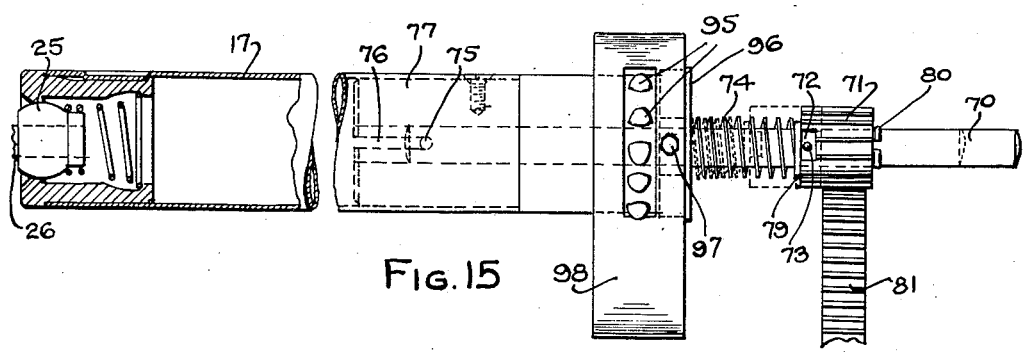

Figures 3, 4, 5 and 6 are views taken on the lines 3—3, 4—4, 5—5 and 6—6 respectively of Figure 1;

Figure 7 is a perspective view of the indexing means employed;

Figure 8 is a sectional view of the electromagnetically operated clutch employed between the driving motor and the gear train associated with the web rollers;

Figure 9 is an end elevational view of one of the clutch elements;

Figure 10 is an end elevational view of the other of the clutch elements;

Figure 11 is a vertical sectional view taken along the line 11—11 of Figure 8;

Figure 12 is a fragmentary view of the web employed in the station indicator of the present invention;

Figure 13 is an end elevational view of the cam means and associated parts for controlling the motion of the web;

Figure 14 is a view taken along the line 14—14 of Figure 13;

Figure 15 is a view of the web index roller; and

Figure 16:
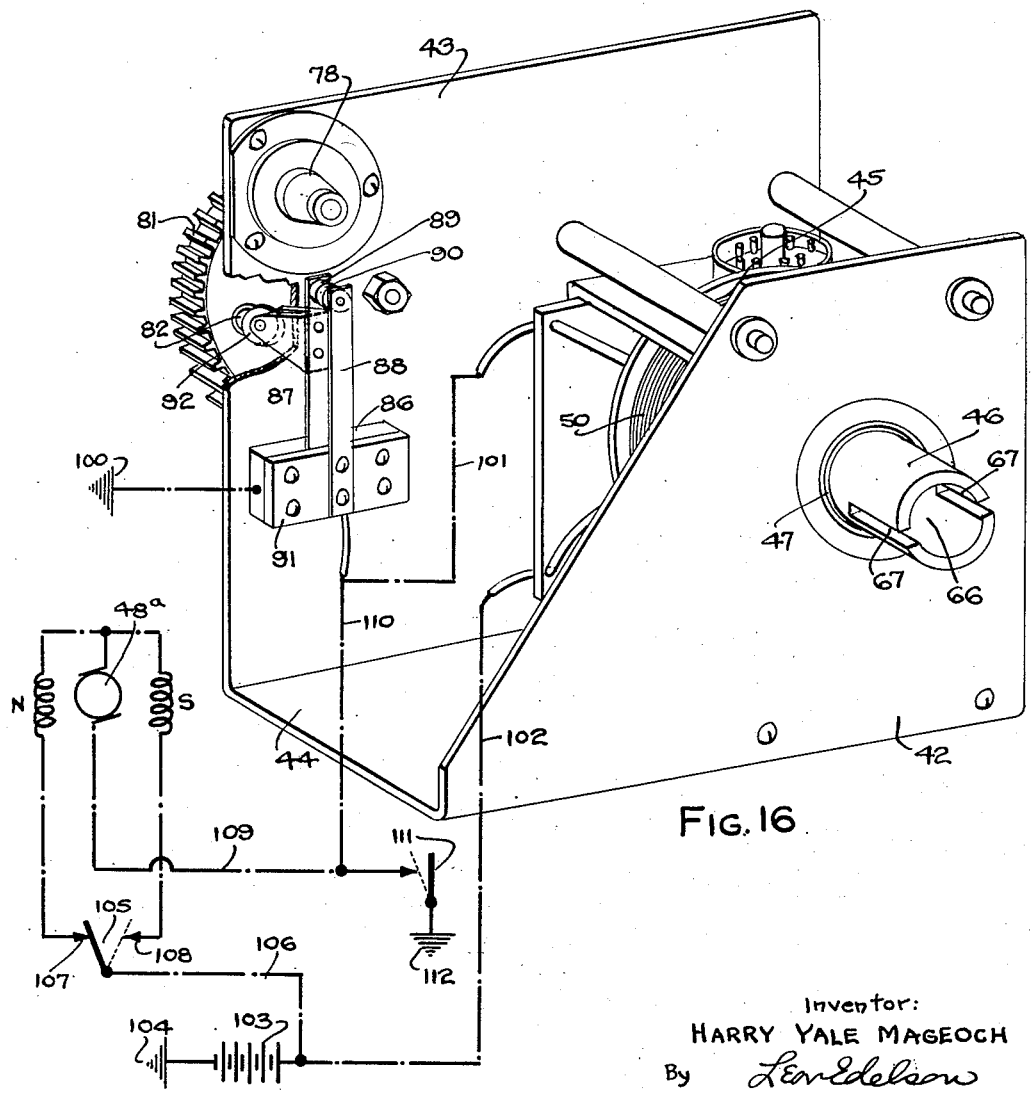

Figure 16 is a perspective view of a sub-assembly of certain parts of the apparatus and showing in diagrammatic form a simple electrical wiring diagram for illustrating the operating principles of the apparatus.

Referring now to the drawings, it will be observed that the apparatus of the present invention comprises a flat rectangular base 10 upon which is mounted in longitudinally spaced relation a pair of vertically disposed roller supporting plates 11 and 12 across the upper edges of which is disposed a top cover plate 13. The members 10, 11, 12 and 13 provide in effect a box-like compartment having oppositely disposed front and rear rectangular openings 14 and 15 (see Figures 3 to 6) respectively disposed in laterally spaced vertical planes.

Journalled within the interior of the compartment are a plurality of rollers 16, 17, 18 and 19 arranged in the spaced relation shown and with their axes extending parallel to each other. Operatively associated with these rollers is a continuous web 20 the opposite ends of which are respectively secured to the lower pair of rollers 16 and 19 while the intermediate portions thereof passes over the upper pair of idler rollers 17 and 18, the arrangement being such that the opposed vertical portions 21 and 22 of the web are respectively visible through the openings 14 and 15 of the compartment in which the web is housed. It will be understood, of course, that each of these openings 14 and 15 is equipped with a suitable window (not shown) of any desired width and depth for exposing to view only so much of the web as is necessary. This may be effected, preferably, by fitting the apparatus herein shown and described within a casing having windows in opposite sides thereof which respectively register with the openings 14 and 15 aforesaid and through which the station names may be viewed as they are successively presented in registering positions with the windows by the movable web.

Mounted interiorly of the web compartment upon the base 10 thereof is a lamp support 23 fitted with lamp sockets for respectively receiving a plurality of electric lamps 24. These lamps 24 are disposed between the vertical portions 21 and 22 of the web so as to illuminate both of the latter portions simultaneously, it being understood that the web bearing thereon the station names or the route designations is so constructed when the lamps are illuminated the names or designations presented in registry with the windows respectively fitted in the openings 14 and 15 become clearly visible to the observer.

As appears most clearly in Figure 12, the station names are so arranged in groups upon the web 20 that when a given name (say "Market") registers with the opening 14, the same name simultaneously appears in registry with the opposite opening 15. In order to accomplish this, each pair of similar names must appear on the web reversely with respect to each other and in such longitudinally spaced relation that they appear simultaneously in the laterally spaced vertical portions 21 and 22 of the web 20. In order to utilize the intervening portion 25a of the web extending between the idler rollers 17 and 18 and so avoid the necessity of employing an excessively long web, other station names or route designations are placed in each of the portions of the web intermediate each pair of reversely arranged similar names. Thus, in the web illustrated in Figure 12, the names of successive stations (Logan, Olney, Market, City Hall, Walnut and South) are arranged sequentially in groups of three stations, each group (A) of obversely lettered stations being spaced from the next succeeding group (B) of similarly lettered stations with the spaces between these groups occupied with groups of reversely lettered stations. By so arranging the station names or route designations upon the web, no substantial part of the latter is wasted and except for one station in each group the web is required to move but a short distance to present to view the name of each succeeding station along the route. For example, if it be assumed that "Logan" is the first station (1) on the route, the web 20 would be so positioned that the name "Logan" first appears in both windows of the apparatus. Thereafter, in succession the names Olney (station 2), Market (station 3), City Hall (station 4), Walnut (station 5) and South (station 6) would appear simultaneously in both windows, it being noted, however, that in order for the name "City Hall" to replace the name "Market", the web 20 would be required to move in the direction indicated in Fig. 12 a distance sufficient to locate the uprightly lettered "City Hall" in the position previously occupied by the similarly lettered "Market", i. e., a distance equal to $a$ in Figure 12. However, for "Market" to replace "Olney" or for "Olney" to replace "Logan", the web would be required to move only the short distance $b$. Of course, this alternating arrangement of obversely and reversely lettered groups of stations would be carried out for all the stations along any designated route.

Preferably, the outer ends of the upper idler rollers 17 and 18 are each provided with spring-pressed self-alining bushings 25 (see Figure 15) into which axially project the supporting pins 26 carried by the end plate 11. The corresponding outer ends of the lower main rollers 16 and 19 are also fitted with similar bushings 27, for respectively receiving therein the supporting pins 28—28 about which these rollers are rotatable. Operatively associated with the lower rollers 16 and 19 is a friction brake mechanism 29, the function of which is to impart a sufficient drag on these rolls for maintaining the tension on the web 20 at the desired amount. As appears most clearly in Figure 2, this friction brake mechanism 29 essentially consists of a spring-pressed yoke 30 the oppositely extending arms 31—31 of which are respectively fitted with friction discs 32—32 adapted to engage the flat end surfaces of the rollers 16 and 19. The pressure exerted by these friction discs 32 against the rollers 16 and 19 may be released as desired by means of the releasing nut 33 threaded on the fixed screw 34 and adapted to press the yoke 30 axially of the screw against the action of the compression spring 35.

The opposite ends of the main rollers 16 and 19 are respectively secured in any suitable manner to the gears 36 and 37 suitably journalled upon the end plate 12, preferably by two or more pins which quick-detachably engage complementally formed sockets provided in the face of each of the gears 36 and 37. These gears 36 and 37 respectively constitute the opposite ends of a series of gears which includes in addition to said gears 36 and 37 the intermediate gears 38, 39 and 40. Of these intermediate gears, those designated 38 and 39 are also journalled upon the end plate 12 and rotate together with the gear 36 in a common vertical plane, these gears 36, 38 and 39 being constantly in mesh. The gear 37 rotates in a plane spaced from the plane of the gears 36, 38 and 39 so that it is at no time in mesh therewith, except during the interval when the gear 40 is transferred from meshing engagement with the gear 37 to the gear 39 and vice versa. The gear 40 is carried by the clutch shaft and is axially shiftable by the means and in the manner hereinafter described to engage either the gear 37 or the gear 39 depending upon the direction in which it is desired to shift the web 20. For example, if the web is to be shifted in the direction of the arrow shown in Figure 5, the pinion gear 40 would be in engagement with the gear 37 and would rotate in the counterclockwise direction indicated to cause the roller 10 connected to the gear 37 to rotate in a direction to wind the web thereabout. During this operation, the gear 36 and its entrained gears 38 and 39 would be disconnected from the pinion gear 40 and such gears would simply rotate due to the pull of the web 20 as it is unwound from the roller 16 to which the gear 36 is connected.

Should it be desired to reverse the direction of movement of the web (as indicated by the dotted arrow in Figure 5) so as to cause it to wind up on the roller 16 and unwind from the roller 19, the pinion gear 40 is axially shifted out of entrainment with the gear 37 and into entrainment with the gear 39 at the same time that it would be rotated in clockwise direction to cause the gears 36, 38 and 39 to rotate as indicated by the dotted arrows.

The mechanism for effecting the aforesaid movement of the web 20 in one direction or the other will now be described. As appears most clearly in Figures 1 and 2, the base 10 of the apparatus is provided at one end thereof with a longitudinal extension 41 upon which is mounted the motor unit for the apparatus. This motor unit includes a U-shaped mounting (see particularly Figure 16) having a pair of spaced vertical panels 42 and 43 joined together at their bottom by a horizontally disposed base member 44 which is adapted to rest upon the extension 41 of the main base 10 of the apparatus. The motor unit mounting is secured in position in any suitable manner with the plate 43 thereof in spaced, parallel relation to the end plate 12 of the web compartment.

Suitably fitted within the mounting between the spaced vertical plates 42 and 43 thereof is an electromagnetically operated clutch 45, one element 46 of which projects outwardly through a suitable opening 47 provided in the mounting plate 44. An electric motor 48 is rigidly connected to and supported upon the outer side of the mounting plate 42, this motor being provided with a driving shaft 49 extending in axial alignment with the longitudinal axis of the electromagnetic coupling or clutch 45. As appears most clearly in Figure 8, this electromagnetically operated clutch 45 comprises an electromagnet 50 of circular form and having an axial bore 51 in which is received the axially movable clutch element 46 and its coacting clutch element 52. This latter element includes a rotatable shaft 53 which is journalled for rotation within a journalled bearing 54 fitted in the end plate 43 of the motor unit mounting. Preferably, ball bearings 55—55 are interposed between the shaft 53 and its support 54. The end of the shaft 53 projecting beyond its supporting plate 43 is provided with a coarse pitch double threaded worm 56 having stops 57 and 58 therein. Operatively associated with this worm 56 is the pinion gear 40, the latter being provided with a collar having internal projections 59—59 which respectively traverse the threads of the worm 56, the arrangement being such that when the shaft 53 is rotated in one direction or the other, the pinion gear 40, when its rotation is retarded due to the load imposed thereon by one or the other of the gears 37 or 39 in mesh therewith and the parts operatively associated with the latter, is shifted axially of the shaft within the limits defined by the worm stops 57 and 58 from the full-line position shown in Figure 8 to the dotted line position, or vice versa, thereby causing the pinion gear to mesh with either the gear 37 or the gear 39 as the case may be. As illustrated in Figure 8, rotation of the shaft 53 in the direction indicated by the arrow results in the pinion gear 40 assuming the full-line position shown and in which it engages the gear 39.

Keyed to the shaft 53, as by the transverse pin 60, is a coupling element 61 the outer face of which is diametrically slotted, as at 62. The outer free extremity of the shaft 53 is of reduced diameter, as at 63. The axially shiftable coupling element 46 is provided in one face thereof with a pair of non-magnetic tooth-like projections 64—64 each of which is formed with oppositely inclined surfaces 65—65. The outer extremity of the element 46 is provided with an enlarged bore 66 the surrounding wall of which is diametrically slotted as at 67—67. The motor shaft 49 is provided in its free extremity with a transversely extending pin 68 the opposite projections of which are preferably fitted with rollers 69—69, which are respectively received in the slots 67—67.

Figure 8 shows the clutch elements 46 and 61 in coupled relation for effecting a straight driving connection between the shaft 49 of the motor 48 and the driving pinion 40, which latter is engageable, as described above, with either one of the gears 36 or 37, depending upon the direction of rotation of the motor shaft 49. It will be understood, of course, that the worm and pin connection between the shaft 53 and the pinion 40 provides for automatic engagement of the pinion 40 with one or the other of the gears 36 or 37 as the motor shaft is rotated in one or the other direction. The clutch element 46 is axially shiftable within the central bore of the electromagnet 50, it being apparent that when this element is shifted to the left, as shown in Figure 8, it affords a driving connection between the motor shaft 49 and the pinion shaft 53 by virtue of the fact that the projections 64 of said element engage in the slots 62 of the coupling element 61 while its outer slots 67—67 respectively engage the rollers 69—69 fitted on the pin 68 extending transversely of the motor shaft 49. This organization of the apparatus as shown in Figure 8 is maintained so long as the electromagnet 50 is electrically energized and exerts a pull on the clutch element 46 sufficient to maintain it in driving connection with the clutch element 61. When, however, the electromagnet 50 is deenergized, there is no longer any magnetic pull exerted on the clutch element 46 in consequence of which rotation of said element results in its being thrown out of driving connection with the element 61 by the action of the inclined surfaces 65—65 on the side walls of the slot 62 in the coupling element 61. It will thus be apparent that immediately upon deenergization of the electromagnet 50 the driving connection between the motor and the driving pinion 40 is interrupted and rotation of the latter is immediately arrested even though the motor may continue to operate or coast under its own inertia. Of course, arresting the rotation of the pinion gear 40 results in simultaneously arresting the movement of the web 20.

In order to insure that the web 20 is arrested in motion at exactly the instant when a given station name or route designation is properly registered in the window or windows of the apparatus, the following described automatically operated means is employed. Not only does this latter means serve to insure the arrest of web motion to accurately locate a given name in position to be viewed by the observer, but it also serves to insure that the several station names or route designations are successively presented to view in the same order in which the stations appear along the route traveled by the vehicle. As appears most clearly in Figure 15, the upper idler roller 17 is provided at the control end thereof with an auxiliary shiftable spindle 70 on which is fitted a pinion gear 71. This pinion gear is provided at its inner side with a diametrically extending slot 72. A pin 73 extending transversely through the spindle 70 is disposed so that it lies within said slot 72, this pin being of a diameter smaller than the width of the slot. A compression spring 74 arranged in intervening relation between the proximate ends of the roller 17 and the pinion 71 imparts to the spindle an outwardly directed spring bias whereby said spindle is normally maintained in the extended position shown in Figure 15. In order to limit the outward movement of this spindle by the action of the compression spring 74 exerted thereon, the inner end of the spindle is provided with a transverse pin 75, the opposite extremities of which traverse longitudinally extending slots 76 formed in a member 77 fitted within the roller 17 and serving as a guide for the inner end of the spindle 70. The outer or free extremity of the spindle 70 is in turn supported for rotation within a suitable bearing 78 therefor located in the upper forward corner of the plate 43 of the motor unit mounting. The pinion 71 is restrained against axial movement relatively to the spindle 70 by means of suitable retaining elements 79 and 80 fixed to the spindle 70. It will be understood, however, that while the pinion 71 is rotatable with the spindle by reason of the pin and slot connection provided by the pin 73 and the slot 72, the pinion 71 is nevertheless free to oscillate about the spindle to the extent permitted by the said pin and slot connection, this for a reason which will be apparent hereinafter.

Journalled upon the face of the plate 43 of the motor unit mounting is a gear 81, the teeth of which normally engage those of the pinion 71 from which it will be apparent that as the web 20 traverses the idler roller 17 and causes it to rotate in one direction or the other, the pinion 71 is likewise caused to rotate and in turn imparts rotation to the large gear 81, which preferably may be termed the cam gear. As appears most clearly in Figures 13 and 14, this cam gear 81 is provided in the outer face thereof with a plurality of circumferentially spaced depressions 82, 83 and 84, the circumferential margins of which are each tapered, as at 85. It will be observed that three of such depressions are provided in the face of the plate, this number corresponding with the number of station names in each spaced group thereof on the web 20.

Mounted upon the plate 43 is a switch 86 consisting of a pair of upwardly extending elements 87 and 88 respectively fitted at their upper extremities with contact elements 89 and 90. The member 88 is normally insulated from the member 87 by the insulation 91, while the member 87 is inherently of such spring bias that it tends normally to assume the dotted line position shown in Figure 13. Carried by the spring biased switch element 87 adjacent the upper end thereof is a cam roller 92 which projects through a suitable opening 93 provided in the plate 43 for contacting engagement with the face of the cam gear 81 at a point located in the circumferential line which passes commonly through the centers of the depressions 82, 83 and 84. The relation of the switch elements 87 and 88, the cam roller 92 and the cam gear 81 is such that when the roller is in engagement with the flat surface of the cam gear, the roller and its supporting switch element 87 assume the full-line positions shown in Figure 13 to thereby bring the contact elements 89 and 90 into contact with each other and so close the switch. However, when the roller rests in one or the other of the depressions 82, 83 or 84, the switch element 87 assumes the dotted-line position due to its inherent resiliency and so separates the contact elements 89 and 90 to open the switch. The operation of the mechanism just described will be explained more fully hereinafter.

Referring now to Figure 12, it will be noted that the right-hand edge of the web 20 is provided with a plurality of longitudinally spaced apertures 94, these apertures being adapted respectively to engage correspondingly spaced radial projections 95 extending circumferentially about the corresponding extremity of the idler roller 17. The perforations 94 in the edge of the web thus coact with the projections 95 on the idler roller to insure positive rotation of the latter as the web 20 is shifted in one direction or the other along its prescribed path of movement. Disposed for free rotation relatively to the idler roller 17 immediately outside of the circumferential row of the projections 95 is a collar 96 to which is secured by means of a screw 97, a guard 98 which overlies the perforated edge of the web 20 and serves to retain the latter in proper engagement with the toothed projections 95 of the idler roller, the guard 98 being, of course, stationary relatively to the rotating idler roller 17. In order to insure against stretching of the web along the perforated edge thereof and also to protect the perforations against mutilation, the web is provided with a flexible metallic edging 99 which is, of course, perforated in correspondence with the perforated edge of the web 20 per se. This metallic edging 99 may be secured to the web in any suitable manner.

Reference has previously been made to the fact that the spindle 70 and the pinion 71 carried thereby are axially shiftable inwardly against the action of the biasing spring 74. This is for the purpose of effecting disengagement of the pinion 71 from the cam gear 81 in order to permit the latter to be freely revolved to set it properly with respect to the web 20. This is for the purpose of effecting disengagement of the pinion 71 from the cam gear 81 in order to permit the latter to be freely revolved to set it properly with respect to the web 20. In the apparatus as illustrated, the cam 81 is properly set with respect to the web 20 when the cam roller 92 engages the depression 82, while the station name "Logan" is in registry with the observation window of the apparatus, it being observed that "Logan" is the first name appearing in the group A, while the depression 82 is the first one of the group thereof provided in the cam gear 81. A similar initial setting of the cam roller 92 in the depression 82 could have been made when the name "City Hall" was properly registered in the observation window because this latter name is also the first one in its own group B. In other words, to set the apparatus initially for operation, the web 20 is so shifted as to present any one of the names appearing thereon centered within the observation window or windows of the apparatus, the perforations 94 of the web being, of course, registered with the tooth projections 95 on the idler roller 17. If the name so appearing in the observation window is the first name in its own group, the cam gear 81 is rotated so as to present the cam roller 92 in registry with the first of the depressions, namely 82. Should the selected name have been the second in its group, the cam gear 81 would be rotated so as to present the cam roller 92 in the second depression 83, while if the third or last name in the group should have been that selected, the cam gear 81 would be rotated so as to present the cam roller in the third or last depression 84. Having so related the cam gear 81 with the web 20, the pinion 71 of the idler roller 17 is then permitted to remesh with the cam gear 81 whereupon the apparatus is ready for operation.

Figure 16 illustrates diagrammatically a simple wiring arrangement for operating the apparatus of the present invention. In this wiring diagram, the motor 48 is designated diagrammatically by the reference numeral 48a, it being noted that this motor is of the reversible type with separate field windings N and S. The switch element 87 is grounded, as at 100, while the switch element 88 is connected by the lead 101 to one terminal of the electromagnet 50, the opposite terminal of this electromagnet being connected by the lead 102 to one terminal of a source of electric supply 103. The opposite terminal of this supply is grounded, as at 104. A single-pole, double-throw switch 105 is connected by the lead 106 to the ungrounded side of the supply 103, while the opposed contacts 107 and 108 of the switch 105 are respectively connected to the opposite fields of the reversible motor 48a. One terminal of the motor armature together with the switch element 88 are commonly connected by the leads 109 and 110 to one terminal of a momentary contact type switch 111, the opposite terminal of which is grounded, as at 112. It will be observed that the electromagnet 50 and the motor 48 are connected in parallel to the source of supply 103.

Assuming that the apparatus has been initially set as above described and that the name next to appear in the observation window or windows of the apparatus will be that of the next station to be approached by the vehicle (Olney), at some point before reaching that station the operator of the vehicle will press the switch 111 (see Figure 16). Immediately this switch 111 is closed, the electromagnet 50 is energized at the same time that the motor 48a is caused to run, it being assumed, of course, that the switch 105 has been properly thrown to operate the motor in the direction necessary to move the web so as to present successively the names of the stations appearing thereon in the same order in which they appear along the route traveled by the vehicle. Upon energization of the electromagnet 50, the clutch member 46 is drawn inwardly of the electromagnet coil and is thereby directly coupled to the clutch element 61, in consequence of which the motor is directly connected to one or the other of the gears 37 or 39. Assuming that it is the gear 37 that is so driven by the motor, the web 20 will move in the direction indicated by the full-line arrow shown in Figure 5. As the web 20 so moves, it imparts a positive rotation to the idler roller 17 and to the pinion 71 rotatable with the latter. This pinion 71 in turn causes the cam gear 81 to rotate in the direction indicated in Figure 14, this rotation being continued until the instant when the cam roller engages one of the depressions in the face thereof, in the assumed case the depression 83. Prior to entry of the cam roller within the depression 83, it rides upon the flat surface of the cam gear 81 and so maintains the switch 86 closed, as shown by the full-line in Figure 13. Consequently, it is only necessary when operating the main switch 111 to maintain it closed for an interval only sufficient to start the motor operating because after the motor is in operation and the switch 86 is closed, the electromagnet and motor circuits continue intact by way of the switch 86, while the main switch 111 is open. These latter circuits may be traced as follows, to wit, from the ground 100, through the switch 86, the electromagnet 50, the battery 103 and the ground 104 for the electromagnet circuit, while from the ground 100 through the switch 86, the motor 48a, the battery 103 and to ground 104 for the motor circuit.

As the cam roller enters the depressions 83, the switch 86 opens and so interrupts both the electromagnet as well as the motor circuit, whereupon the electromagnet is deenergized, the clutch elements 46 and 61 are disconnected and the motion of the web 20 is arrested. This operation is repeated for each station approached by the vehicle, it being understood, of course, that in lieu of manually operating the contact switch 111 by the operator, means may be employed for automatically effecting this operation during the run between successive stations along the route.

It will be understood, of course, that the number of the cam depressions and the spacing thereof in the cam gear 81 bear a definite relation to the arrangement of the station names on the web 20. Thus, the spacing between centers of the cam depressions 82 and 83 is so synchronized with the spacing between centers of the names "Logan" and "Olney" that as the latter name displaces the former in the window of the indicator, the cam depression 83 moves into position to engage the cam roller 92 in place of the cam depression 82. Similarly, the cam depression 84 displaces the cam depression 83 when the name "Olney" is displaced by the name "Market". In each of these instances, the cam gear 81 rotates through an arc of relatively small degree to correspond with the relatively short movement of the web 20 (distance b in Figure 12). However, in order for the name "City Hall" to displace the name "Market" the web 20 is required to move through the greater distance a (Figure 12) and in correspondence therewith the cam gear 81 rotates through an arc of sufficient degree to cause the cam roller 92 to be re-engaged by the cam depression 82. In other words, as the six stations 1, 2, 3, 4, 5 and 6 appearing on the web 20 illustrated in Figure 12 are successively presented to view in the window of the indicator, the cam gear 81 is rotated to successively present the cam depressions thereof in engagement with the cam roller 92 in the following order: 82—83—84—82—83—84. In each instance, as the cam roller seats itself in a cam depression, the switch 86 opens and so interrupts both the motor and electromagnet circuits to immediately arrest the movement of the web 20. When, however, the switch 111 is closed, these circuits are again closed in consequence of which the web resumes its motion, the cam gear 81 resumes its rotation and the cam roller 92 thereupon is forced out of the depression in which it was seated to close the switch 86, this switch being maintained closed so long as the cam roller 92 remains in engagement with the flat surface of the cam gear.

Of course, when the vehicle retraces its course so that the stations are approached in an order reversed from that above mentioned, the motor switch 105 is thrown to reverse the direction of motor operation, in which event the web 20 moves in a direction to successively present the station names in the order 6, 5, 4, 3, 2, 1. Naturally, the cam gear 81 is then reversed in direction of rotation to successively present the cam depressions in engagement with the cam roller in the following sequential order: 84—83—82—84—83—82.

In order to insure an immediate and positive break between the contact elements 89 and 90 of the control switch 86 as the cam roller engages the depressions in the cam gear 81 and to prevent the possibility of these contacts closing unintentionally due to any inertia which may be stored up in the moving parts of the apparatus and which would tend to carry the cam gear 81 to a point where the cam roller 92 may be forced out of the depression in which it should seat, the pin and slot connection 72—73 between the pinion gear 71 and the spindle 70 has been provided. It will be observed that when the cam roller 92 engages the advance edge of the depression in which it is to be seated, the normal tendency of the switch element 87 due to its inherent resiliency is to snap the cam roller 92 into the said depression. In order to permit this action to take place, the pinion 71 is provided with a limited freedom of movement relatively to its spindle 70 with the result that as the cam roller snaps into one or the other of the depressions in the cam gear 81, the latter is given a relatively sharp impulse in the direction of its rotation to thereby quickly seat the cam roller in the depression to the fullest extent possible, this forward impulse being permitted by reason of the limited play between the pinion 71 and its spindle 70. Of course, when the contact switch 111 is again closed to thereby preliminarily complete the motor and electromagnet circuits so that the web 20 is again placed in motion, the pinion 71 is driven by the pin 73 and in turn imparts rotation to the cam gear 81.

It will be understood, of course, that it is preferable in the operation of the apparatus to so include the lamps 24 in circuit with the motor and electromagnet that they become illuminated only during the periods that the web is stationary and the name of the approaching station is in proper position within the observation window of the apparatus.

It will be understood, of course, that the invention is susceptible of various changes and modifications from time to time without departing from the real spirit or general principles thereof and it is accordingly intended to claim the same broadly, as well as specifically, as indicated by the appended claims.

What is claimed as new and useful is:—

1. A station indicator comprising a movable web bearing thereon the names of stations in the order in which they appear along a given route, a roller over which said web is adapted to move, coacting means in said web and roller for constantly maintaining a definite relation between said web and roller, electric-motor-driven means for shifting said web to successively present to view at a given point the several station names, and means controlled by said roller for interrupting said web-shifting means automatically as each station name is presented at said given viewing point.

2. A station indicator comprising a movable web bearing thereon the names of stations in the order in which they appear along a given route, a plurality of rollers over which said web passes, said rollers being relatively arranged so that a portion of said web moves in a vertical plane spaced inwardly of an observation aperture in said indicator, one of said rollers being an idler roller having means thereon engageable with spaced perforations in one edge of the web for insuring rotation of said idler roller in definite relation to the linear movement of said web, electric-motor-driven means for shifting said web to successively present to view in said observation aperture the several station names, and means controlled by the rotation of said idler roller to interrupt said web-shifting means and thereby arrest the motion of the web automatically at the instant when a station name appears in said observation window.

3. A station indicator comprising a box-like housing, a pair of main rollers journalled in said housing, a web having opposite ends thereof respectively secured to said main rollers whereby the web may be wound upon one and unwound from the other of said rollers, a pair of idler rollers respectively journalled above said main rollers and adapted to support said web so that a portion thereof traverses a vertical plane, coacting means in said web and one of said idler rollers to insure positive rotation of the latter as said web is progressively shifted about said rollers, a motor for driving one of said main rollers to thereby shift said web, an electromagnetically operated clutch interposed between said motor and web-shifting roller, and means governed by the rotation of said positively rotated idler roller to render said clutch inoperative as a driving coupling between said motor and web-shifting roller.

4. In a station indicator, a housing having an opening in at least one side thereof through which a station name may be observed, a web disposed within said housing and bearing thereon a plurality of station names spaced lengthwise of the web, said web having a plurality of perforations spaced longitudinally along one edge thereof, means for successively presenting said names in position to be viewed through said opening, said means including a motor-driven main roller about which said web is wound, an auxiliary idler roller over which said web passes, having toothed engagement with said web perforations whereby said idler roller is rotated in accordance with the travel of said web thereover, and cam means operatively associated with said idler roller to arrest the motion of said web automatically as each name thereon is presented to view in said opening.

5. In a station indicator, a web bearing thereon a plurality of route designations arranged in spaced relation lengthwise of the web, said web being provided along a longitudinal edge thereof with a plurality of longitudinally spaced perforations bearing a fixed relation to said route designations, means operative to shift said web to successively present said designations at a given point, sprocket means in engagement with the perforations in the web, and means actuated by said sprocket means to arrest the motion of the web as each of said designations is presented at said given point.

6. In a station indicator as defined in claim 5 wherein said web is provided with a flexible metallic edging perforated as and for the purpose mentioned.

7. In a station indicator, a web having thereon a series of longitudinally spaced route designations, a plurality of rollers about which said web passes to successively present to view said route designations, said rollers including a driving roller about which said web is wound and an idler roller over which said web passes during movement thereof, coacting means in said web and idler roller for imparting rotation to said idler roller upon motion of said web, a pinion carried by said idler roller and rotatable therewith, a cam gear entrained with said pinion, and means operatively associated with said cam gear for arresting the motion of said driving roller automatically as said web is shifted through distances of predeterminedly fixed linear extents.

8. In a station indicator as defined in claim 7 wherein an electric motor is employed to impart rotation to said driving roller and wherein said motion arresting means includes an electric switch connected in circuit with said motor, said switch being actuated by said cam gear to open the motor circuit.

9. In a station indicator, a web having thereon a series of longitudinally spaced route designations, a plurality of rollers about which said web passes to successively present to view said route designations, said rollers including a driving roller about which said web is wound and an idler roller over which said web passes during movement thereof, coacting means in said web and idler roller for imparting rotation to said idler roller upon motion of said web, a motor for driving said driving roller, a clutch interposed between said motor and driving roller, and means operatively associated with said idler roller to actuate said clutch to free said driving roller from said motor and so arrest the rotation of said driving roller automatically as said web is shifted through distances of predeterminedly fixed linear extents.

10. In a station indicator as defined in claim 9 wherein said clutch is electro-magnetically operated and wherein said means for arresting rotation of said driving roller includes a normally closed switch which is opened to render said clutch inoperative as a driving element at the instant when web motion is to be arrested.

11. In a station indicator as defined in claim 9 wherein said clutch includes an electro-magnet embracing a pair of coupling elements axially movable into and out of coupling engagement upon energization or deenergization of said electro-magnet, and wherein said means for arresting motion of said driving roller included a switch in circuit with said electromagnet for actuating the latter to disengage said coupling elements and so arrest the motion of said web.

12. In a station indicator as defined in claim 7 wherein said pinion is axially shiftable to effect its disengagement with said cam gear whereby to permit the latter to be freely rotated into properly related position with respect to said web.

13. In a station indicator as defined in claim 7 wherein said pinion is axially shiftable out of mesh with said cam gear whereby to permit the latter to be freely rotated into proper relation with respect to said web and wherein said pinion is spring-pressed to normally maintain it in mesh with said cam gear.

14. In a station indicator, a continuous web having thereon a series of longitudinally spaced route designations, a plurality of rollers about which said web passes including an idler roller adapted to be rotated positively by said web during motion of the latter, a pinion carried by and rotatable with said idler roller, a cam gear entrained with said pinion and having in one face thereof a plurality of circumferentially spaced depressions, the spacing of the latter being in accordance with the spacing of the route designations on said web, and means operatively associated with the cam gear for arresting motion of the web, said means including a switch one element of which is spring-biased and carries a cam roller adapted to ride into and out of said depressions in the cam gear during rotation of the latter, the switch being actuated to arrest the web motion upon entry of said cam roller in any one of said depressions.

15. In a station indicator as defined in claim 14 wherein said pinion partakes of a limited oscillatory motion relatively to said idler roller whereby as said spring-biased idler roller engages the leading edge of a cam gear depression it imparts a rotative impulse to the latter in the direction of its normal rotation and in opposition to the normal rotation of said pinion to instantaneously seat the cam-roller in said depression.

16. In a station indicator, a pair of main rollers arranged in laterally spaced relation, a web having the opposite ends thereof respectively secured to said main rollers whereby it may be wound upon one of said rollers and unwound from the other thereof, said rollers being each provided at corresponding ends thereof with a driving gear, a driving shaft rotatable in one direction or the other as desired and arranged with its inner end in proximity to said roller gears, an axially shiftable pinion fitted on said inner end of said shaft and rotatable therewith, said pinion being shiftable into entrainment with one or the other of said rollers depending upon the direction of rotation of said driving shaft.

17. In a station indicator as defined in claim 16 wherein said shaft includes a worm operable within the bore of said pinion for shifting said pinion axially of the shaft as aforesaid, said worm being provided with stops to confine said axial shifting of the pinion within predetermined limits.

HARRY YALE MAGEOCH.